(12) United States Patent
Stephenson et al.

(10) Patent No.: US 12,502,743 B2
(45) Date of Patent: Dec. 23, 2025

(54) TOOLING ASSEMBLY WITH INTERNAL COOLANT PASSAGES FOR MACHINES

(71) Applicant: Ford Motor Company, Dearborn, MI (US)

(72) Inventors: David Stephenson, Detroit, MI (US); Timothy G. Beyer, Troy, MI (US); Michael A. Kopmanis, Monroe, MI (US); David Ozog, Brownstown, MI (US); William E. Dowling, Jr., Saline, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 18/639,235

(22) Filed: Apr. 18, 2024

(65) Prior Publication Data

US 2024/0261919 A1 Aug. 8, 2024

Related U.S. Application Data

(62) Division of application No. 17/958,791, filed on Oct. 3, 2022, now Pat. No. 11,986,919, which is a division
(Continued)

(51) Int. Cl.
*B23Q 3/157* (2006.01)
*B23B 51/06* (2006.01)
(Continued)

(52) U.S. Cl.
CPC .......... *B23Q 3/15724* (2016.11); *B23Q 3/155* (2013.01); *B23Q 11/1023* (2013.01);
(Continued)

(58) Field of Classification Search
CPC ......... Y10T 407/14; Y10T 408/45–455; Y10T 409/303976–304088; Y10S 29/092;
(Continued)

(56) References Cited

U.S. PATENT DOCUMENTS 2,325,973 A * 8/1943 Nurnberger ............. B23B 51/06
408/59
2,541,849 A * 2/1951 Villeneuve ............. B23B 51/06
408/59
(Continued)

FOREIGN PATENT DOCUMENTS

CN 102672212 9/2012
DE 102007042279 A1 * 3/2009 ................ B21F 7/00
WO WO-2018166889 A1 * 9/2018 ................ B22F 3/20

OTHER PUBLICATIONS

Office Action issued in corresponding CN Application 20181158285. 01, issued Jun. 14, 2025 and an English Translation, 37 pages.

*Primary Examiner* — Sunil K Singh
*Assistant Examiner* — Michael Vitale
(74) *Attorney, Agent, or Firm* — Burris Law, PLLC

(57) ABSTRACT

A tooling assembly for a machine having an automatic tool changing system includes a tool body disposed about a rotational axis and defining an internal passage operable to flow a fluid therein. The internal passage includes an inlet, stem channel, first and second curved channels, and first and second transition portions. The inlet is configured to receive the fluid from the machine. First and second outlets are open through an exterior of the tool body. The stem channel is in fluid communication with the inlet and ends at a beginning of the first and second transition portions. The first curved channel extends from the first transition portion to the first outlet. The second curved channel extends from the second transition portion to the second outlet.

20 Claims, 5 Drawing Sheets

Related U.S. Application Data of application No. 15/864,031, filed on Jan. 8, 2018, now Pat. No. 11,491,594.

(51) Int. Cl.
*B23Q 3/155* (2006.01)
*B23Q 11/10* (2006.01)

(52) U.S. Cl.
CPC ....... *B23B 51/068* (2022.01); *B23C 2210/285* (2013.01); *Y10S 29/092* (2013.01); *Y10T 408/45* (2015.01); *Y10T 409/304032* (2015.01); *Y10T 483/1733* (2015.01); *Y10T 483/1891* (2015.01)

(58) Field of Classification Search
CPC ....... B23B 27/10; B23B 51/06; B23B 51/068; B23B 2250/12; B23Q 11/1023
USPC ................ 409/135–137; 408/57–59; 407/11; 29/DIG. 92

See application file for complete search history.

(56) References Cited

U.S. PATENT DOCUMENTS

| | | | |
|---|---|---|---|
| 3,364,800 A * | 1/1968 | Benjamin | B23Q 1/0036 408/239 R |
| 5,489,208 A * | 2/1996 | Mandell | A61C 1/052 433/165 |
| 5,676,499 A * | 10/1997 | Tukala | B23B 51/0493 408/59 |
| 2013/0302748 A1* | 11/2013 | Friedrichs | A61C 3/02 156/89.28 |
| 2016/0263666 A1* | 9/2016 | Myers | B23C 5/28 |
| 2018/0133809 A1* | 5/2018 | Brunner | B23Q 11/1023 |
| 2018/0185939 A1* | 7/2018 | Ning | B23D 77/006 |
| 2021/0001438 A1* | 1/2021 | Royer | B23P 15/52 |

* cited by examiner

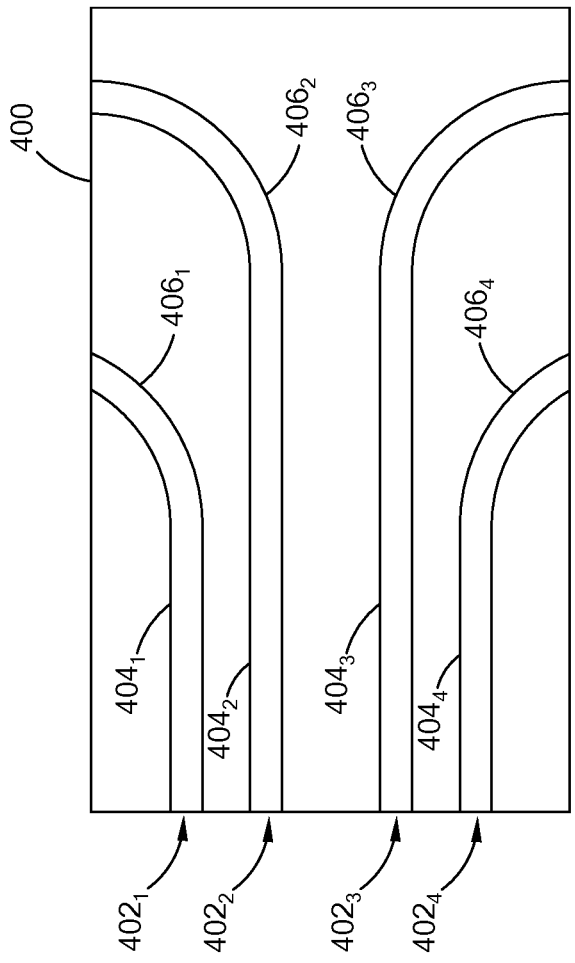
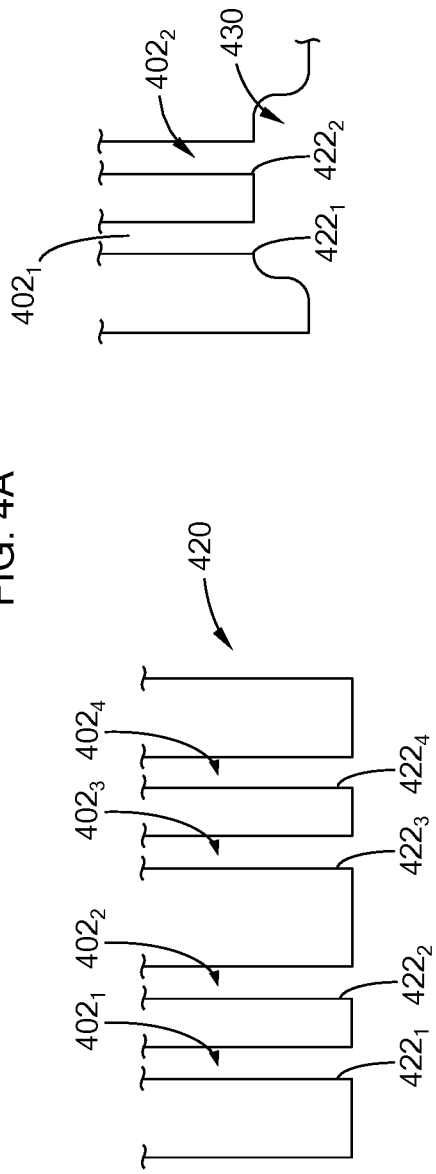
FIG. 4A
FIG. 4B
FIG. 4C

TOOLING ASSEMBLY WITH INTERNAL COOLANT PASSAGES FOR MACHINES

CROSS-REFERENCE TO RELATED APPLICATIONS

This application is a divisional application of U.S. Ser. No. 17/958,791, filed Oct. 3, 2022, titled "TOOLING ASSEMBLY WITH INTERNAL COOLANT PASSAGES FOR MACHINES", which is a divisional application of U.S. Ser. No. 15/864,031, filed Jan. 8, 2018, now U.S. Pat. No. 11,491,594, and titled "TOOLING ASSEMBLY WITH INTERNAL COOLANT PASSAGES FOR MACHINES", the contents of which are incorporated herein in their entirety.

FIELD

The present disclosure relates to coolant passage for a tooling assembly.

BACKGROUND

The statements in this section merely provide background information related to the present disclosure and may not constitute prior art.

Computer numerical control (CNC) machines having an automatic tool changing system generally include multiple tooling assemblies that are attachable to a spindle of the machine. The tooling assemblies can be used for forming complex features in high volume machining. This type of tooling assembly typically have a steel tool body to which inserts of hard tool materials, such as cemented tungsten carbide or polycrystalline diamond, are affixed at points where material is to be removed. Examples of such tooling assemblies include multi-diameter boring bars and large milling cutters.

As the tooling assembly machines a workpiece, friction between the two components can generate heat and material machined from the workpiece may begin to accumulate at the cutting edges of the tool. Accordingly, in many applications, a coolant fluid (e.g., liquid and/or gas) is routed through internal passages to each cutting edge to prevent material buildup and control temperature. For example, a minimum quantity lubrication (MQL) machine uses a combination of lubricant and compressed air to coat the interface of the tooling assembly with a thin film to prevent heat buildup through friction reduction. In another form, the CNC machine may be a fluid cooling machine that uses water based coolant to cool the tooling assembly and expel material bits machined from the workpiece.

In both machines, coolant passes through a channel provided within the spindle to the internal passage of the tooling assembly. These passages are typically straight uniform passages that are formed by, for example, drilling for water-based coolant CNC machines or wire electrodischarge machining for minimum quantity lubrication (MQL) machines. Both methods are prone to creating passages that have missed connections and/or overshoot, which can cause backpressure, turbulent fluid flow, and can diminish the life of the tool.

SUMMARY

This section provides a general summary of the disclosure, and is not a comprehensive disclosure of its full scope or all of its features.

In one form, the present disclosure is directed toward a tooling assembly for a machine having an automatic tool changing system. The tooling assembly includes a holder, a tool body, and an internal passage defined within and extending through the holder and the tool body. The holder includes a machine interface at one end, and the machine interface is configured to engage with a spindle of the machine. The tool body is disposed at the other end of the holder. The internal passage is operable to have a coolant fluid flow within, and has a stem channel and a curved channel extending from the stem channel.

In another form, the internal passage has a tapered portion connecting the stem channel and the curved channel.

In yet another form, the holder and the tool body are made of one of steel, molybdenum, tungsten, and cemented tungsten carbide.

In one form, the internal passage includes a plurality of the curved channels branching from the stem channel of the internal passage.

In another form, the machine interface defines an inlet, the tool body defines a plurality of outlets, and the internal passage has a plurality of the curved channels branching from the stem channel. The internal passage extends from the inlet of the machine interface to the outlets of the tool body. The stem channel is fluidly coupled to the inlet and each of the plurality of the curved channels are fluidly coupled to an outlet from among the plurality of the outlets.

In yet another form, the internal passage has one or more linear channels branching from the stem channel, and each of the linear channels is fluidly coupled to an outlet from among the plurality of outlets.

In one form, the tooling assembly further includes a plurality of the internal passages defined within and extending through the holder and the tool body.

In another form, the machine interface defines a plurality of inlets, the tool body defines a plurality of outlets, and each of the plurality of the internal passages extend from an inlet from among the plurality of inlets to one or more outlets from among the plurality of outlets. The stem channel of each of the plurality of the internal passages fluidly couples to the inlet and the curved channel fluidly couples to the outlet.

In yet another form, one or more internal passages from among the plurality of the internal passages has a plurality of the curved channels branching from the stem channel. Each of the plurality of the curved channels connects to an outlet from among the plurality of outlets.

In one form, the present disclosure is directed toward, a tooling assembly for a machine having an automatic tool changing system. The tooling assembly includes a holder, a tool body, and an internal passage. The holder includes a machine interface at one end, and the machine interface is adapted to engage with a spindle of the machine and defines an inlet. The tool body is disposed at the other end of the holder, and defines a plurality of outlets. The internal passage is defined within and through the holder and the tool body. The internal passage is operable to have a coolant fluid flow within. The internal passage has a stem channel and a curved channel. The stem channel extends from the inlet and the curved channel extends from the stem channel and fluidly couples to an outlet from among the plurality of outlets.

In another form, the internal passage has a transition portion connecting the stem channel and the curved channel. A size of the transition portion decreases from a first cross-sectional dimension at a first end to a second cross-sectional dimension at a second end opposite the first end.

The first end is fluidly coupled to the stem channel and the second end is fluidly coupled to the curved channel.

In yet another form, the internal passage includes a plurality of the curved channels branching from the stem channel, and each of the curved channels fluidly couple to an outlet from among the plurality of outlets.

In one form, the internal passage has one or more linear channels extending from the stem channel, and each of the one or more linear portions fluidly couple to an outlet from among the plurality of outlets.

In another form, the tooling assembly further includes a plurality of the internal passages. The machine interface defines a plurality of the inlets, and the stem channel of each of the internal passages is fluidly coupled to an inlet from among the plurality of the inlets.

In yet another form, the holder defines a sump cavity adjacent to the inlets.

In one form, a cross-sectional size of the curved channel varies from the stem channel to the outlet.

In another form, the tooling assembly further includes a plurality of cutting inserts disposed along an outer surface of the tool body.

In one form, the present disclosure is directed toward a tooling assembly that includes a tool and multiple internal passages. The tool includes a machine interface at one end, and defines an inlet at the one end and multiple outlets at the other end. The machine interface is configured to engage with a machine spindle. The multiple internal passages are defined within the tool, and each internal passage has a stem connected to the inlet, and a curved channel extending from the stem and connected to one of the outlets.

In another form, a cross-sectional size of the curved channel varies from the stem to the outlet.

In yet another form, the internal passage has a tapered portion connecting the stem and the curved channel.

In still another form, a tooling assembly for a machine having an automatic tool changing system includes a tool body. The tool body is disposed about a rotational axis. The tool body defines a first internal passage operable to have a coolant fluid flow within. The first internal passage includes an inlet, a stem channel, a first curved channel, a first transition portion, a first outlet, a second curved channel, a second transition portion, and a second outlet. The inlet is configured to receive the coolant fluid from the machine. The first and second outlets are open through an exterior of the tool body. The stem channel is in fluid communication with the inlet and ends at a beginning of the first and second transition portions to provide the coolant from the inlet to the first and second transition portions. The first curved channel is in fluid communication with the first transition portion and the first outlet to provide the coolant from the first transition portion to the first outlet. The first curved channel extends from the first transition portion to the first outlet. The second curved channel is in fluid communication with the second transition portion and the second outlet to provide the coolant from the second transition portion to the second outlet. The second curved channel extends from the second transition portion to the second outlet. At least one region of the first transition portion tapers from a first diameter to a second diameter. The first diameter is greater in size than the second diameter and located upstream of the second diameter. At least one region of the second transition portion tapers from a third diameter to a fourth diameter. The third diameter is greater in size than the fourth diameter and located upstream of the fourth diameter.

According to a variety of alternative forms, that can be used with the tooling assembly of the above paragraph individually or in any combination thereof: the first and third diameters are equal; the second and fourth diameters are equal; the second and fourth diameters are equal; the second diameter is equal to a beginning diameter of the first curved channel; the fourth diameter is equal to a beginning diameter of the second curved channel; the first diameter is at the beginning of the first transition portion and the second diameter is at a beginning of the first curved channel; the third diameter is at the beginning of the second transition portion and the fourth diameter is at a beginning of the second curved channel; the stem channel has an end diameter located at an end of the stem channel that is greater than the first diameter and is greater than the third diameter; a beginning diameter of the first curved channel is greater than a diameter of the first outlet; a beginning diameter of the second curved channel is greater than a diameter of the second outlet; the stem channel is linear; the stem channel is coaxial with the rotational axis; the tool body is made of one of steel, molybdenum, tungsten, and cemented tungsten carbide; the tooling assembly further includes a holder disposed about the rotational axis and including a machine interface at one end, wherein the machine interface is configured to engage with a spindle of the machine to be rotated about the rotational axis by the spindle, the tool holder defining a second internal passage operable to receive the coolant fluid from the machine and have the coolant fluid flow within, wherein the inlet is configured to receive the coolant fluid from the second internal passage.

In still another form, a tooling assembly for a machine having an automatic tool changing system includes a tool body. The tool body is disposed about a rotational axis. The tool body defines a first internal passage operable to have a coolant fluid flow within. The first internal passage includes an inlet, a stem channel, a first curved channel, a first transition portion, a first outlet, a second curved channel, a second transition portion, and a second outlet. The inlet is configured to receive the coolant fluid from the machine. The first and second outlets are open through an exterior of the tool body. The stem channel is linear and in fluid communication with the inlet and ends at a beginning of the first and second transition portions to provide the coolant from the inlet to the first and second transition portions. The first curved channel is in fluid communication with the first transition portion and the first outlet to provide the coolant from the first transition portion to the first outlet, and the first curved channel extends from the first transition portion to the first outlet. The second curved channel is in fluid communication with the second transition portion and the second outlet to provide the coolant from the second transition portion to the second outlet, and the second curved channel extends from the second transition portion to the second outlet. At least one region of the first transition portion tapers from a first diameter to a second diameter, the first diameter being greater in size than the second diameter and located upstream of the second diameter. At least one region of the second transition portion tapers from a third diameter to a fourth diameter, the third diameter being greater in size than the fourth diameter and located upstream of the fourth diameter. The second diameter is equal to a beginning diameter of the first curved channel. The fourth diameter is equal to a beginning diameter of the second curved channel.

According to a variety of alternative forms, that can be used with the tooling assembly of the above paragraph individually or in any combination thereof: the first diameter is at the beginning of the first transition portion, wherein the third diameter is at the beginning of the second transition portion; the second diameter is at a beginning of the first curved channel and the fourth diameter is at a beginning of the second curved channel; a diameter of the first outlet is less than the second diameter, wherein a diameter of the second outlet is less than the fourth diameter.

In yet a further form, a tooling assembly for a machine having an automatic tool changing system includes a tool body. The tool body is disposed about a rotational axis. The tool body defines a first internal passage operable to have a coolant fluid flow within. The first internal passage includes an inlet, a stem channel, a first curved channel, a first transition portion, a first outlet, a second curved channel, a second transition portion, and a second outlet. The inlet is configured to receive the coolant fluid from the machine. The first and second outlets are open through an exterior of the tool body. The stem channel is linear and in fluid communication with the inlet and ends at a beginning of the first and second transition portions to provide the coolant from the inlet to the first and second transition portions. The first curved channel is in fluid communication with the first transition portion and the first outlet to provide the coolant from the first transition portion to the first outlet, and the first curved channel extends from the first transition portion to the first outlet. The second curved channel is in fluid communication with the second transition portion and the second outlet to provide the coolant from the second transition portion to the second outlet, and the second curved channel extends from the second transition portion to the second outlet. The first transition portion tapers from a first diameter at the beginning of the first transition portion to a second diameter at an end of the first transition portion, the first diameter being greater in size than the second diameter. The second transition portion tapers from a third diameter at the beginning of the second transition portion to a fourth diameter at an end of the second transition portion, the third diameter being greater in size than the fourth diameter. The second diameter is equal to a beginning diameter of the first curved channel. The fourth diameter is equal to a beginning diameter of the second curved channel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4A is a partial cross-sectional of multiple internal passages disposed in a tooling assembly in accordance with the teachings of the present disclosure;

FIG. 4B illustrates multiple inlets coupled to the internal passages of the tooling assembly of FIG. 4A in accordance with the teachings of the present disclosure;

FIG. 4C illustrates a sump cavity defined adjacent to an inlet that is coupled to the internal passage of the tooling assembly of FIG. 4A in accordance with the teachings of the present disclosure;

Figure 1:
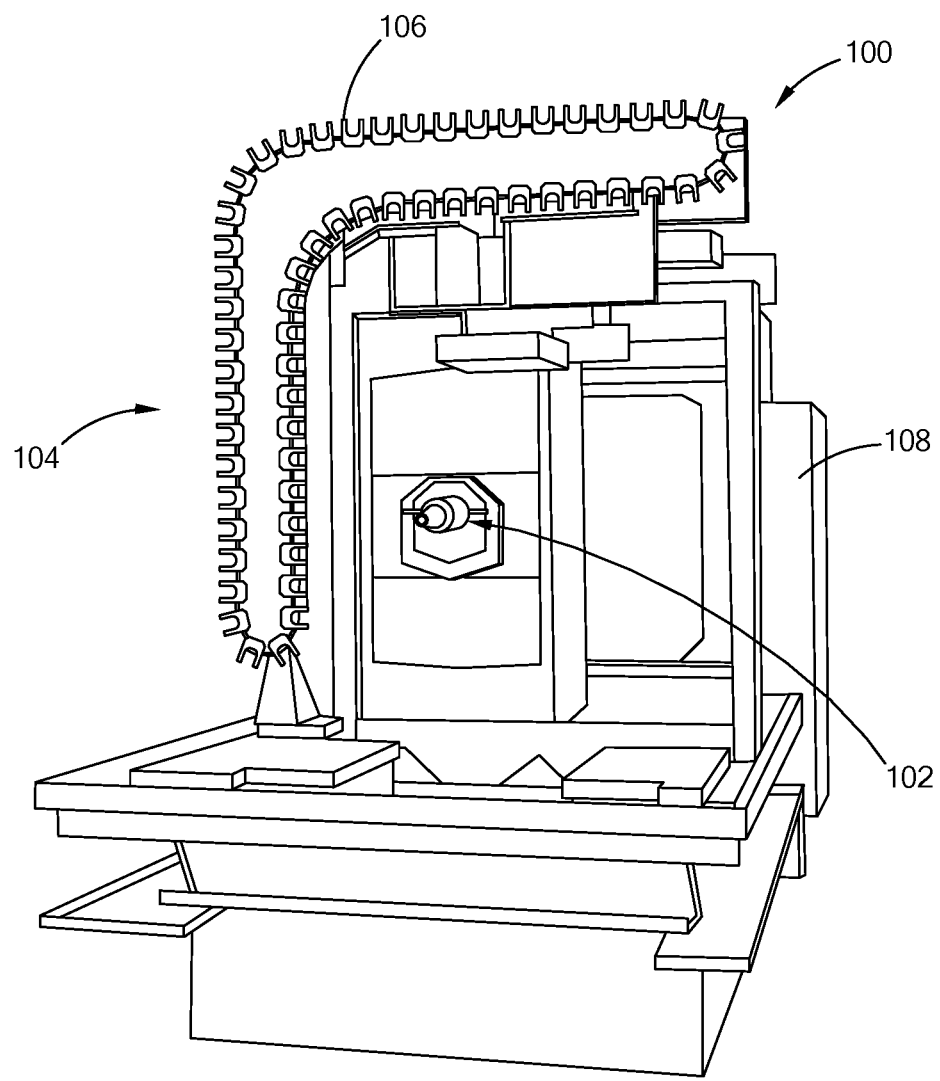
FIG. 1 is a perspective view of a computer numerical control (CNC) machine having an automatic tool changing system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a computer numerical control (CNC) machine 100 is operable to form complex parts, such as gear sets, torque converters, etc., from a workpiece. In addition to other components, the CNC machine 100 generally includes a spindle 102, an automatic tool changing system 104 having a magazine 106, and a controller 108 for executing one or more programs to operate the CNC machine 100. While not shown in FIG. 1, the magazine 106 may store tooling assemblies, such as multi-diameter boring bars and milling cutters with cutting inserts disposed on the cutter.

In operation, the automatic tool changing system 104 is operable by the controller 108 to load the spindle 102 with a tooling assembly from the magazine 106. The spindle 102 is aligned with the workpiece and machines the workpiece by driving the tooling assembly attached thereon. As the tooling assembly machines the workpiece, friction between the two components can generate heat and material machined from the workpiece may begin to accumulate at the cutting edges of the tool.

Figure 2:
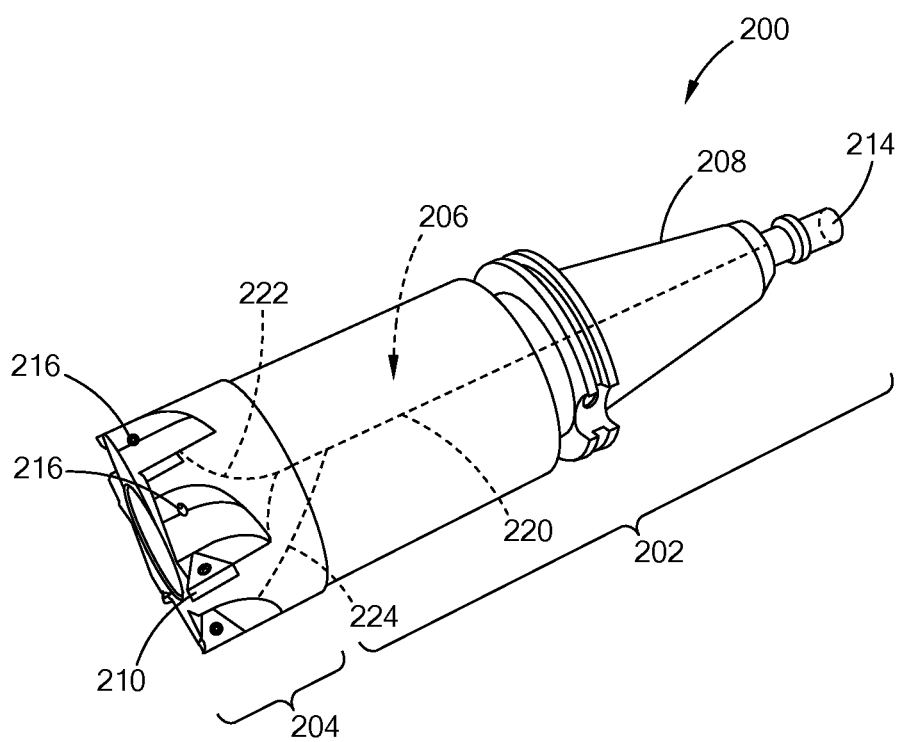
FIG. 2 is a perspective view of a tooling assembly for the CNC machine and having an internal passage in accordance with the teachings of the present disclosure.

To prevent material build-up and reduce heat, the tooling assemblies have an internal coolant passage for receiving a coolant fluid, such as liquid and/or gas based coolants. Specifically, referring to FIG. 2, a tooling assembly 200 includes a holder 202, a tool body 204, and one or more internal passages 206 defined within. The tooling assembly 200 is configured to attach to a spindle of a CNC machine having an automatic tool changing system, similar to the one illustrated in FIG. 1.

The holder 202 has a machine interface 208 that is disposed at one end of the holder 202 and is configured to engage with the spindle of the machine. The tool body 204 is disposed at the other end of the holder 202 and includes one or more cutting edges 210. The tool body and the holder may be collectively referred to as a tool.

In one form, the cutting edges 210 are inserts of a hard tool material, such as cemented tungsten carbide or polycrystalline diamond, and are affixed at points along the outer surface of the tool body 204 where material is to be removed. While the tooling assembly 200 is illustrated as having a tool body formed like a cutting tool with inserts, the tooling assembly 200 may also have other suitable tool bodies. For example, the tool body may be a single- or multi-diameter boring bar. Thus, the teachings of the present disclosure are applicable to other tool bodies and should not be limited to those illustrated in the drawings.

The tooling assembly 200 is made of a hard material such as steel, molybdenum, tungsten, or cemented tungsten carbide. In one form, the holder 202 and the tool body 204 are formed as one solid part, and in another form, the holder 202 and the tool body 204 may be formed as separate parts that are joined together to form the tooling assembly 200. The tooling assembly 200 may be formed using three-dimensional (3D) printing system, such as metal binder jet printing.

The internal passage 206 extends from the holder 202 to the tool body 204. More particularly, the machine interface 208 of the holder 202 defines an inlet 214 that connects to a fluid channel provided within the spindle (not shown), and the tool body 204 defines one or more outlets 216. The internal passage 206 fluidly couples or in other words, connects the inlet 214 with the outlets 216 to dispense the coolant fluid. In one form, the outlets 216 are arranged adjacent to the cutting edges 210 of the tool body 204.

The internal passage 206 include a stem channel 220 and one or more curved channels 222 extending from the stem channel 220. In one form, in addition to the curved channels 222, the internal passage 206, includes a linear channel 224 extending from the stem channel 220. The inlet 214 is fluidly coupled to the stem channel 220, and one or more of the outlets 216 are fluidly coupled to a curved channel 222. For example, with no linear channels, the internal passage 206 includes one curved channel 222 for each of the outlets 216. In another example, the outlets 216 are connected to either a curved channel 222 or a linear channel 224.

Figure 3:
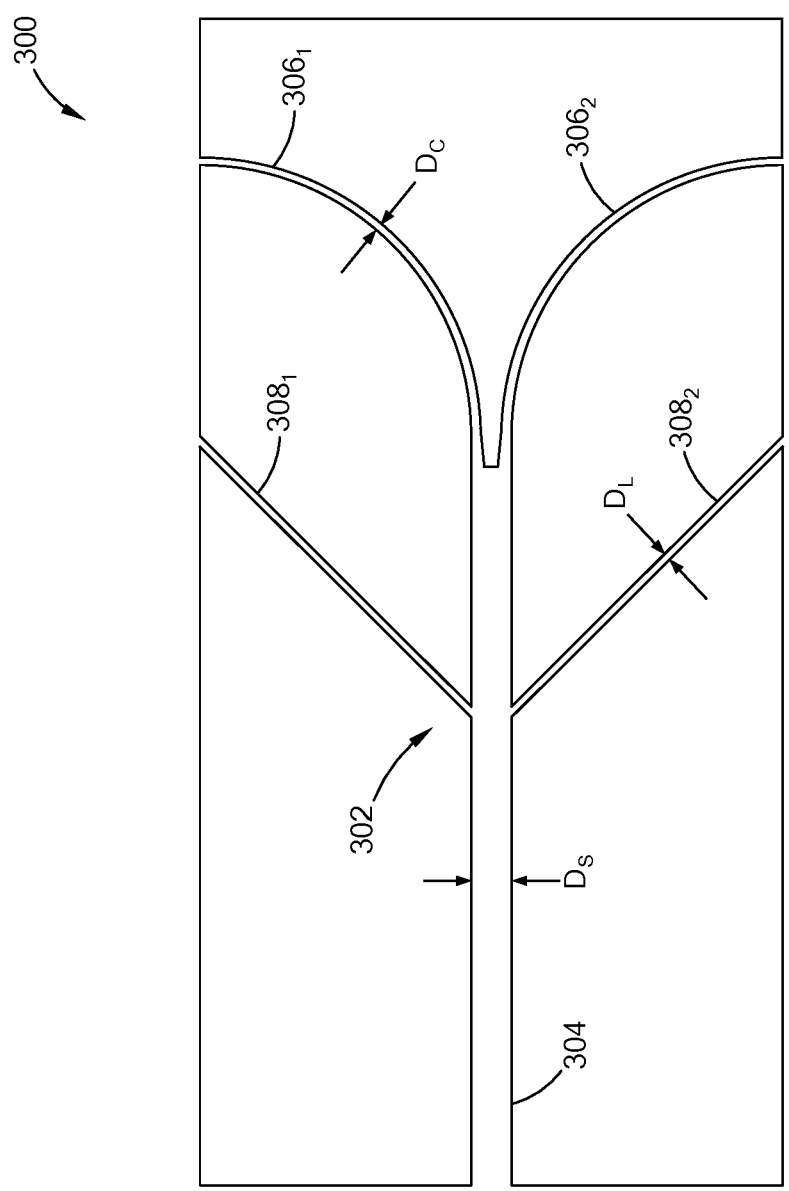
FIG. 3 is a partial cross-sectional view of an internal passage with curved channels branching from a stem channel in accordance with the teachings of the present disclosure.

Referring to FIG. 3, a cross-sectional view of a tooling assembly 300 having an internal passage 302 is illustrated. The internal passage 302 includes a stem channel 304 having multiple curved and linear channels branching from the stem channel 304. Specifically, two curved channels $306_1$ and $306_2$, and two linear channels $308_1$ and $308_2$ extend from the stem channel 304. The curved channels $306_1$ and $306_2$ may collectively be referred to as curved channels 306, and the linear channels $308_1$ and $308_2$ may collectively be referred to as linear channels 308.

The tooling assembly 300 has one internal passage 302 having one main stem channel 304 from which multiple curved channels 306 branch from. In another form, the tooling assembly is configured to have multiple internal passages, where each internal passage has a stem channel and at least one curved channel. For example, referring to FIG. 4A, a tooling assembly 400 includes internal passages $402_1$ to $402_4$ that are collectively referred to as internal passages 402. Each of the internal passages 402 includes a stem channel 404 ($404_1$ to $404_4$ in figure) and at least one curved channel 406 (i.e., $406_1$ to $406_4$ in figure).

The holder of the tooling assembly 400 can be figured in various suitable ways to fluidly couple the internal passages 402 to the fluid channel of the spindle. For example, referring to FIG. 4B, a holder 420 for the tooling assembly 400 defines a separate inlet 422 (i.e., $422_1$ to $422_4$ in figure) for each of the internal passages 402. The inlets 422 may directly abut with the fluid channel of the spindle to receive the coolant fluid. Alternatively, as illustrated in FIG. 4C, the holder 420 defines one or more sump cavities 430 adjacent to the inlets 422 to equalize pressure and ensure even coolant distribution from two or more adjacent internal passages 402.

Each of the internal passages 402 of the tooling assembly 400 has one curved channel 406 extending from its respective stem 404. In another form, one or more of the internal passage 402 may have multiple curved channels 406 extending from the stem 404. For example, internal passages $404_3$ and $404_3$ may be replaced with one internal passage having a stem and at least two curve channels that extend to the outlets of channels $406_2$ and $406_3$. In another form, in addition to a curved channel, some of the internal passages 402 may have a linear channel extending from the stem channel.

The cross-section of the internal passage described herein may be a circular-shape, an oval-shape, or other suitable rounded shaped for inhibiting back pressure and loss of fluid pressure. The size or dimensions of the cross-section may be different between the stem channel, the curved channel, and the linear channel. For example, referring to FIG. 3, with the internal passage 302 having a circular cross-section, the diameter of the stem channel 304 (i.e., $D_S$) is greater than that of the curved channels 306 ($D_C$) and the linear channels 308 (i.e., $D_L$).

Figure 5:
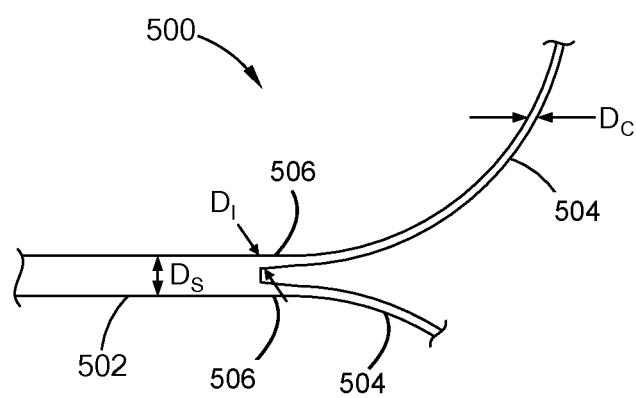
FIG. 5 illustrates a section of an internal passage having a transition portion disposed between a stem channel and a curved channel in accordance with the teachings of the present disclosure.

To further control the flow of coolant fluid, the internal passage may be configured to gradually change the cross-sectional dimensions between the various channels. For example, referring to FIG. 5, in one form, an internal passage 500 includes a stem channel 502, a curved channel 504, and a transition portion (i.e., tapered portion) 506 disposed between the stem channel 502 and the curved channel 504. With the internal passage 500 having a circular shape, the transition portion 506 has a varying diameter that gradually decreases from an initial diameter ($D_I$) to that of the curved channel 504 ($D_C$). In other words, a size of the transition portion 506 decreases from a first cross-sectional dimension (e.g., $D_I$) at a first end to a second cross-sectional dimension (e.g., $D_C$) at a second end opposite the first end. The first end is fluidly coupled to the stem channel 502 and the second end is fluidly coupled to the curved channel 504. The transition portion may be incorporated with the internal passages illustrated in FIGS. 3 and 4A.

Figure 6:
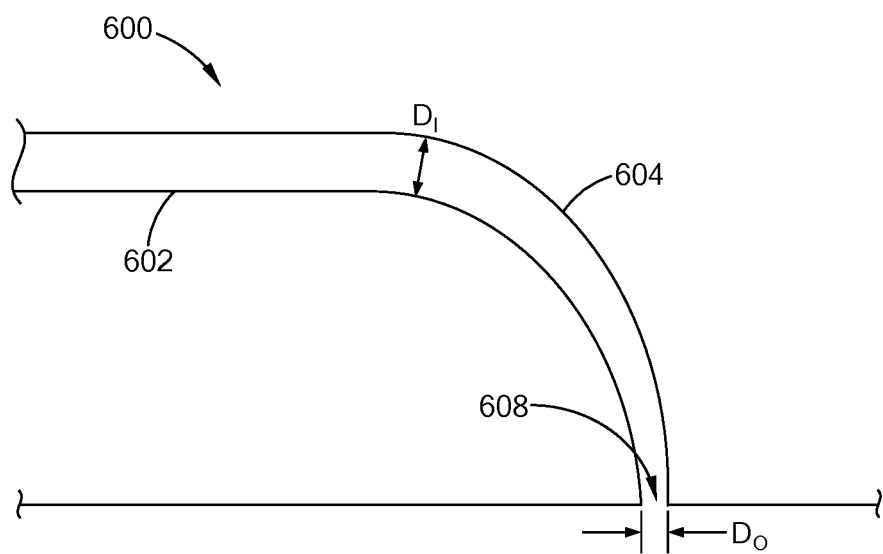
FIG. 6 illustrates a section of an internal passage having a curved channel with varying dimensions in accordance with the teachings of the present disclosure.

In another form, the curved channel may be configured to have a cross-section that varies in size. For example, as shown in FIG. 6, an internal passage 600 having a circular cross-section includes a stem channel 602 and a curved channel 604. The diameter of the curved channel 604 tapers from an initial diameter ($D_I$) to a diameter of an outlet 608 ($D_O$). The curved channel having a varying cross-sectional dimension may be incorporated with the internal passages illustrated in FIGS. 3 and 4A.

In the following, variations described with respect to the curved channel are also applicable to the linear channels provided in the internal passage. For example, a transition portion may be provided between a linear channel and the stem channel, and the linear channel may have a varying cross-sectional dimension.

The structural characteristics of the internal passage(s) of the tooling assembly is dependent on various parameters such as the type of coolant fluid being used, flow properties of the fluid, and technical specifications of the machine receiving the tool. For example, for a MQL type of machine, parameters to consider include but are not limited to, average airflow speed, flow rate of the air, turbulence set point, lubricant droplet size, lubricant droplet distribution, and net oil discharged. It should be readily understood that various other parameters may be used to determine the structural characteristics of the internal passage.

Tooling assemblies having the internal passage of the present disclosure include one or more curved passages that can benefit the flow of coolant fluid through the tool. For example, for a MQL machine, the curved passages can benefit air flow, reduce air boosting, and increase tool life. In addition, the tooling assembly having multiple internal passages with curved passages, inhibit backpressure, increase flow rates, and ensure even flow to all edges under varying input pressure conditions for both wet and MQL machining.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tooling assembly for a machine having an automatic tool changing system, the tooling assembly comprising:
   a tool body disposed about a rotational axis, the tool body defining a first internal passage operable to have a coolant fluid flow within, wherein the first internal passage includes an inlet, a stem channel, a first curved channel, a first transition portion, a first outlet, a second curved channel, a second transition portion, and a second outlet,
   wherein the inlet is configured to receive the coolant fluid from the machine,
   wherein the first and second outlets are open through an exterior of the tool body,
   wherein the stem channel is in fluid communication with the inlet and in fluid communication with a respective separate beginning of each of the first and second transition portions to provide the coolant fluid from the inlet to each of the first and second transition portions,
   wherein the first curved channel is in fluid communication with the first transition portion and the first outlet to provide the coolant fluid from the first transition portion to the first outlet, and the first curved channel extends from the first transition portion to the first outlet,
   wherein the second curved channel is in fluid communication with the second transition portion and the second outlet to provide the coolant fluid from the second transition portion to the second outlet, and the second curved channel extends from the second transition portion to the second outlet,
   wherein at least one region of the first transition portion tapers from a first diameter to a second diameter, the first diameter being greater in size than the second diameter and located upstream of the second diameter,
   wherein at least one region of the second transition portion tapers from a third diameter to a fourth diameter, the third diameter being greater in size than the fourth diameter and located upstream of the fourth diameter.

2. The tooling assembly of claim 1, wherein the first and third diameters are equal.

3. The tooling assembly of claim 2, wherein the second and fourth diameters are equal.

4. The tooling assembly of claim 1, wherein the second and fourth diameters are equal.

5. The tooling assembly of claim 1, wherein the second diameter is equal to a beginning diameter of the first curved channel.

6. The tooling assembly of claim 5, wherein the fourth diameter is equal to a beginning diameter of the second curved channel.

7. The tooling assembly of claim 1, wherein the first diameter is at the beginning of the first transition portion and the second diameter is at a beginning of the first curved channel.

8. The tooling assembly of claim 7, wherein the third diameter is at the beginning of the second transition portion and the fourth diameter is at a beginning of the second curved channel.

9. The tooling assembly of claim 1, wherein the stem channel has an end diameter located at an end of the stem channel that is greater than the first diameter and is greater than the third diameter.

10. The tooling assembly of claim 1, wherein a beginning diameter of the first curved channel is greater than a diameter of the first outlet.

11. The tooling assembly of claim 10, wherein a beginning diameter of the second curved channel is greater than a diameter of the second outlet.

12. The tooling assembly of claim 1, wherein the stem channel is linear.

13. The tooling assembly of claim 12, wherein the stem channel is coaxial with the rotational axis.

14. The tooling assembly of claim 1, wherein the tool body is made of one of steel, molybdenum, tungsten, and cemented tungsten carbide.

15. The tooling assembly of claim 1 further comprising a tool holder disposed about the rotational axis and including a machine interface at one end, wherein the machine interface is configured to engage with a spindle of the machine to be rotated about the rotational axis by the spindle, the tool holder defining a second internal passage operable to receive the coolant fluid from the machine and have the coolant fluid flow within, wherein the inlet is configured to receive the coolant fluid from the second internal passage.

16. A tooling assembly for a machine having an automatic tool changing system, the tooling assembly comprising:
   a tool body disposed about a rotational axis, the tool body defining a first internal passage operable to have a coolant fluid flow within, wherein the first internal passage includes an inlet, a stem channel, a first curved channel, a first transition portion, a first outlet, a second curved channel, a second transition portion, and a second outlet,
   wherein the inlet is configured to receive the coolant fluid from the machine,
   wherein the first and second outlets are open through an exterior of the tool body,
   wherein the stem channel is linear and in fluid communication with the inlet and in fluid communication with a respective separate beginning of each of the first and second transition portions to provide the coolant fluid from the inlet to each of the first and second transition portions,
   wherein the first curved channel is in fluid communication with the first transition portion and the first outlet to provide the coolant fluid from the first transition portion to the first outlet, and the first curved channel extends from the first transition portion to the first outlet,
   wherein the second curved channel is in fluid communication with the second transition portion and the second outlet to provide the coolant fluid from the second transition portion to the second outlet, and the second curved channel extends from the second transition portion to the second outlet,
   wherein at least one region of the first transition portion tapers from a first diameter to a second diameter, the first diameter being greater in size than the second diameter and located upstream of the second diameter,
   wherein at least one region of the second transition portion tapers from a third diameter to a fourth diameter, the third diameter being greater in size than the fourth diameter and located upstream of the fourth diameter, wherein the second diameter is equal to a beginning diameter of the first curved channel, wherein the fourth diameter is equal to a beginning diameter of the second curved channel.

17. The tooling assembly of claim 16, wherein the first diameter is at the beginning of the first transition portion, wherein the third diameter is at the beginning of the second transition portion.

18. The tooling assembly of claim 17, wherein the second diameter is at a beginning of the first curved channel and the fourth diameter is at a beginning of the second curved channel.

19. The tooling assembly of claim 16, wherein a diameter of the first outlet is less than the second diameter, wherein a diameter of the second outlet is less than the fourth diameter.

20. A tooling assembly for a machine having an automatic tool changing system, the tooling assembly comprising:

a tool body disposed about a rotational axis, the tool body defining a first internal passage operable to have a coolant fluid flow within, wherein the first internal passage includes an inlet, a stem channel, a first curved channel, a first transition portion, a first outlet, a second curved channel, a second transition portion, and a second outlet, wherein the inlet is configured to receive the coolant fluid from the machine, wherein the first and second outlets are open through an exterior of the tool body, wherein the stem channel is linear and in fluid communication with the inlet and in fluid communication with a respective separate beginning of each of the first and second transition portions to provide the coolant fluid from the inlet to each of the first and second transition portions, wherein the first curved channel is in fluid communication with the first transition portion and the first outlet to provide the coolant fluid from the first transition portion to the first outlet, and the first curved channel extends from the first transition portion to the first outlet, wherein the second curved channel is in fluid communication with the second transition portion and the second outlet to provide the coolant fluid from the second transition portion to the second outlet, and the second curved channel extends from the second transition portion to the second outlet, wherein the first transition portion tapers from a first diameter at the beginning of the first transition portion to a second diameter at an end of the first transition portion, the first diameter being greater in size than the second diameter, wherein the second transition portion tapers from a third diameter at the beginning of the second transition portion to a fourth diameter at an end of the second transition portion, the third diameter being greater in size than the fourth diameter, wherein the second diameter is equal to a beginning diameter of the first curved channel, wherein the fourth diameter is equal to a beginning diameter of the second curved channel.

* * * * *